United States Patent [19]

Emery

[11] Patent Number: 5,720,507
[45] Date of Patent: Feb. 24, 1998

[54] BED LINER WITH SIDE WALL LOAD RESTRAINING AND SUPPORT STRUCTURE

[75] Inventor: Phillip L. Emery, Portage, Wis.

[73] Assignee: Penda Corporation, Portage, Wis.

[21] Appl. No.: 95,316

[22] Filed: Jul. 21, 1993

[51] Int. Cl.$^6$ .................................................. B62D 33/02
[52] U.S. Cl. .................................... 296/39.2; 410/129
[58] Field of Search .......................... 296/39.2, 39.1, 296/183; 410/129, 89, 140, 141, 142, 143, 144, 145, 151, 152

[56] References Cited

U.S. PATENT DOCUMENTS

| | | | |
|---|---|---|---|
| D. 271,009 | 10/1983 | Fishler | D12/98 |
| 2,697,631 | 12/1954 | Miller | 296/28 |
| 2,791,463 | 5/1957 | Levitt | 296/28 |
| 2,808,788 | 10/1957 | Stough | 105/367 |
| 2,985,333 | 5/1961 | Kirkman | 220/22 |
| 3,554,429 | 1/1971 | Cohen | 229/15 |
| 3,680,492 | 8/1972 | Weage | 105/376 |
| 4,047,749 | 9/1977 | Lambitz et al. | 296/39 R |
| 4,215,898 | 8/1980 | Ulics | 296/183 |
| 4,278,376 | 7/1981 | Hunter | 410/130 |
| 4,436,215 | 3/1984 | Kleinert et al. | 220/22.3 |
| 4,507,033 | 3/1985 | Boyd | 410/105 |
| 4,552,272 | 11/1985 | Field | 211/88 |
| 4,592,583 | 6/1986 | Dresen et al. | 296/39 R |
| 4,650,383 | 3/1987 | Hoff | 410/149 |
| 4,750,776 | 6/1988 | Barben | 296/39 R |
| 4,767,149 | 8/1988 | Rye | 296/39.2 |
| 4,887,947 | 12/1989 | Bott | 410/144 |
| 4,958,876 | 9/1990 | Diaco et al. | 296/39.2 |
| 4,991,899 | 2/1991 | Scott | 296/39.2 |
| 5,044,682 | 9/1991 | Wayne | 296/39.2 |
| 5,044,848 | 9/1991 | Burnham | 410/102 |
| 5,090,763 | 2/1992 | Kremer et al. | 296/39.1 |
| 5,154,478 | 10/1992 | Erickson et al. | 296/39.2 |
| 5,167,434 | 12/1992 | Bott | 296/39.2 |
| 5,207,472 | 5/1993 | Gower | 296/39.2 |
| 5,240,301 | 8/1993 | Arnold | 296/39.2 |
| 5,265,993 | 11/1993 | Wayne | 296/39.2 X |
| 5,308,133 | 5/1994 | Mangum et al. | 296/39.2 |

*Primary Examiner*—Joseph D. Pape
*Attorney, Agent, or Firm*—Lathrop & Clark

[57] ABSTRACT

A thermoformed thermoplastic bed liner has a bottom wall which overlies the floor of a truck cargo bed and two side walls which extend upwardly and outwardly from the bottom wall on opposite sides. A vertically extending channel is formed in each liner side wall which extends exterior to the side wall and which engages with a board member to restrict movement of cargo with the truck bed. The channel extends into an intermediate volume defined between a truck bed side wall and the liner side wall. Each channel has an exterior wall and two side walls. The exterior wall extends generally perpendicular to the liner bottom wall at an angle less than the angle of the side walls. Channels may be provided which are spaced above the bottom wall for supporting elevated load restricting boards. A board pocket is formed in each side wall above a channel such that the channel intersects the base of the board pocket and the structure of the channel reinforces and rigidities the board pocket to assist in supporting the loads of elevated boards and cargo.

16 Claims, 6 Drawing Sheets

BED LINER WITH SIDE WALL LOAD RESTRAINING AND SUPPORT STRUCTURE

FIELD OF THE INVENTION

This invention relates to truck bed liners in general and to thermoformed thermoplastic truck bed liners in particular.

BACKGROUND OF THE INVENTION

Although long used in agricultural and commercial applications, pick-up trucks with open cargo beds have also become increasingly popular as personal and family vehicles. The commercial vehicle owner, although concerned with performance and cost effectiveness of the vehicle, often considers the vehicle as a traveling company advertisement or symbol. A neat and well-maintained vehicle is more likely to favorably impress customers. Owners of personal vehicles, while concerned with functionality and efficiency, are also concerned with pride of ownership, personal image, and outward appearances. In addition, the automotive enthusiast desires to maintain his vehicle in as close to a "like new" condition as possible.

Truck bed liners of plastic or rubber are commonly employed to protect the painted metal surfaces of a pick-up truck cargo bed. These truck bed liners are available in a wide variety of configurations to suit the wide variety of available trucks. Bed liners protect the cargo bed from scratching and denting as well as paint fading from exposure to sunlight and elements. One-piece thermoformed thermoplastic truck bed liners provide a cost effective means of protecting the truck cargo bed.

To facilitate the handling of cargo, many truck cargo boxes have features which stabilize and control shifting of cargo in the truck box. For instance, the box may have stake holes along the upper peripheral edges so that boards may be inserted into the sides of the truck box, so extending the sides to retain light-weight, high-volume loads such as fiberglass insulation and baled hay. Some truck boxes have supports on the side walls for horizontal boards, so that wide loads may be supported above the interiorly extending truck wheel wells on horizontal boards.

Some trucks have features formed into the sides of the truck to support a plank or "2×4" board so it extends upright across the width of the bed. Boards extending across the floor of the bed of the cargo box are useful to prevent the shifting of cargo as the truck accelerates and brakes.

Truck bed liners have been developed which extend existing features in truck cargo boxes and which provide features such as horizontal board pockets for use in truck boxes that lack them. For instance, one type of truck bed liner provides a series of board slots formed by vertical bars which extend into the interior of the cargo box. These series of board slots allow a vertical 2×4 board to be adjustably positioned among the slots to lock the load into place.

Bed liners come in two general types, so-called "over-the-rail" liners which extend up and cover the upper edges of the cargo box, and so-called "under-the-rail" liners in which side-walls of the liner terminate under the upper flanges or rails of the cargo box.

Bed liners with features which extend into the box from the wall narrow the overall width of the box floor, which may decrease the useful capacity of the liner equipped truck.

Bed liners which have board pockets for the support of horizontal elevated boards in truck boxes which do not have corresponding board pockets, may provide insufficient support for the horizontal boards and whatever load is put on them, as the load is supported by the plastic side walls of the liner. The more-or-less planar side walls of the liner are prone to buckling with relatively light loads.

What is needed is a truck bed liner which can accommodate boards slots which do not reduce the width of the cargo bed. Furthermore, a means is needed for better reinforcing the horizontal board pockets in liners for trucks which do not incorporate horizontal board pocket structure.

SUMMARY OF THE INVENTION

The truck bed liner of this invention is a unitary thermoformed thermoplastic article which mounts within a vehicle cargo bed. The bed liner has a bottom wall and two side walls which extend upwardly from opposite sides of the bottom wall and which are inclined outwardly from the bottom wall. Pairs of vertically extending channels are formed on the side walls. Each channel has an exterior wall which is positioned outwardly from a surrounding portion of the side wall, and front and rear restraining walls which define an inwardly opening receptacle for a restraining member such as a 2×4 board. The restraining member serves to restrain the longitudinal movement of articles positioned within the bed liner. The channel does not reduce the usable volume of the bed liner as it extends exterior to the truck bed into otherwise unused space. The channels may be positioned level with the bottom wall of the liner, or they may be elevated on the liner side walls. Several channels may be stacked one above the other to permit the use of elevated restraining members. A single vertical channel may receive two or more vertically stacked restraining boards, or a single restraining member of substantial height. A load-supporting pocket may be formed in the side wall above each channel so that the channel intersects the pocket base, thereby structurally reinforcing the pocket and reducing the likelihood of buckling in the side wall beneath the pocket. Load supporting members such as 2×4 or 2×6 boards may thus be securely supported in the stiffened pockets.

It is an object of the present invention to provide a bed liner which provides load restraining and support features without significantly detracting from the usable volume of the bedliner.

It is a further object of the present invention to provide a truck bed liner with structure to restrict load shifting which minimally interferes with available cargo volume.

It is also an object of the present invention to provide a truck bed liner with structure for supporting a restraining member above the bed liner bottom panel.

It is an additional object of the present invention to provide a truck bed liner with structure for supporting a support member above the liner bottom which is stiffened to resist buckling of the liner side wall.

Further objects, features, and advantages of the invention will be apparent from the following detailed description when taken in conjunction with the accompanying drawings.

DESCRIPTION OF THE PREFERRED EMBODIMENTS

Referring more particularly to FIGS. 1–10, wherein like numbers refer to similar parts, an under-the-rail bed liner 20 is shown in FIGS. 1–4 which may be installed within the cargo bed of a conventional pick-up truck and attached in any known manner. The bed liner 20 has two pairs of load-restraining channels 26 and two pairs of load supporting pockets 66. These features facilitate the handling of shiftable or large cargo payloads.

The bed liner 20 is formed through a single sheet thermoforming process and is formed from thermoplastic sheet stock such as one-quarter inch thick high density polyethylene In the thermoforming process a one-sided thermoforming vacuum mold has a plurality of vacuum ports through which air is drawn to draw a heated thermoplastic sheet against the mold to form the sheet in general conformity to the shape of the mold.

The bed liner 20 has a bottom wall 28 which overlies and covers the truck cargo bed floor. The bed liner bottom wall 28 extends generally in a horizontal plane. However, it is preferably provided with a series of inverted U-shaped longitudinal ribs 32 which contribute to the rigidity of the bottom wall.

Figure 4:
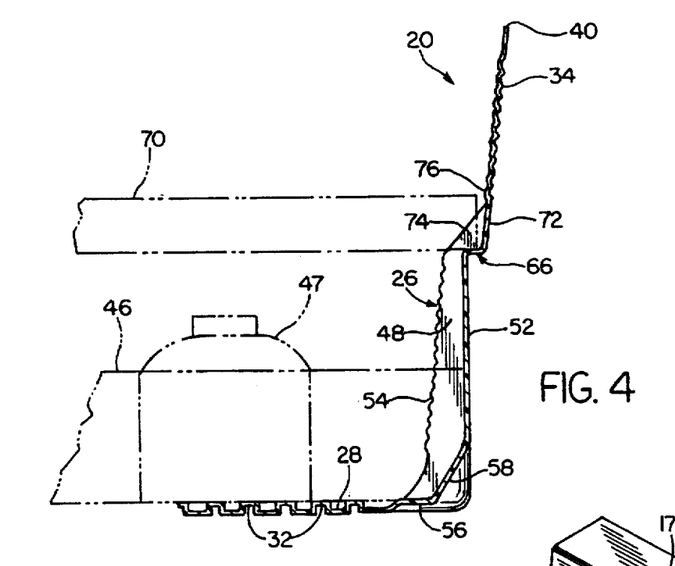
FIG. 4 is a cross-sectional view of the bed liner of FIG. 2 taken along section line 4—4.

As shown in FIG. 4, two side walls 34 extend upwardly from the bed liner bottom wall 28 and are inclined from the liner bottom at an angle greater than perpendicular, preferably an angle of up to twelve degrees outwardly from vertical. The side walls 34 are joined at the front of the bed liner by a liner front wall 36 which extends upwardly from the bed liner bottom wall 28. The bed liner side walls are positioned on the interior sides of the truck cargo bed side walls and serve to shield and protect the side walls from soiling and damage. Each bed liner side wall 34 has an upper margin 40 which engages against a truck cargo bed side wall beneath a truck bed side rail.

Figure 1:
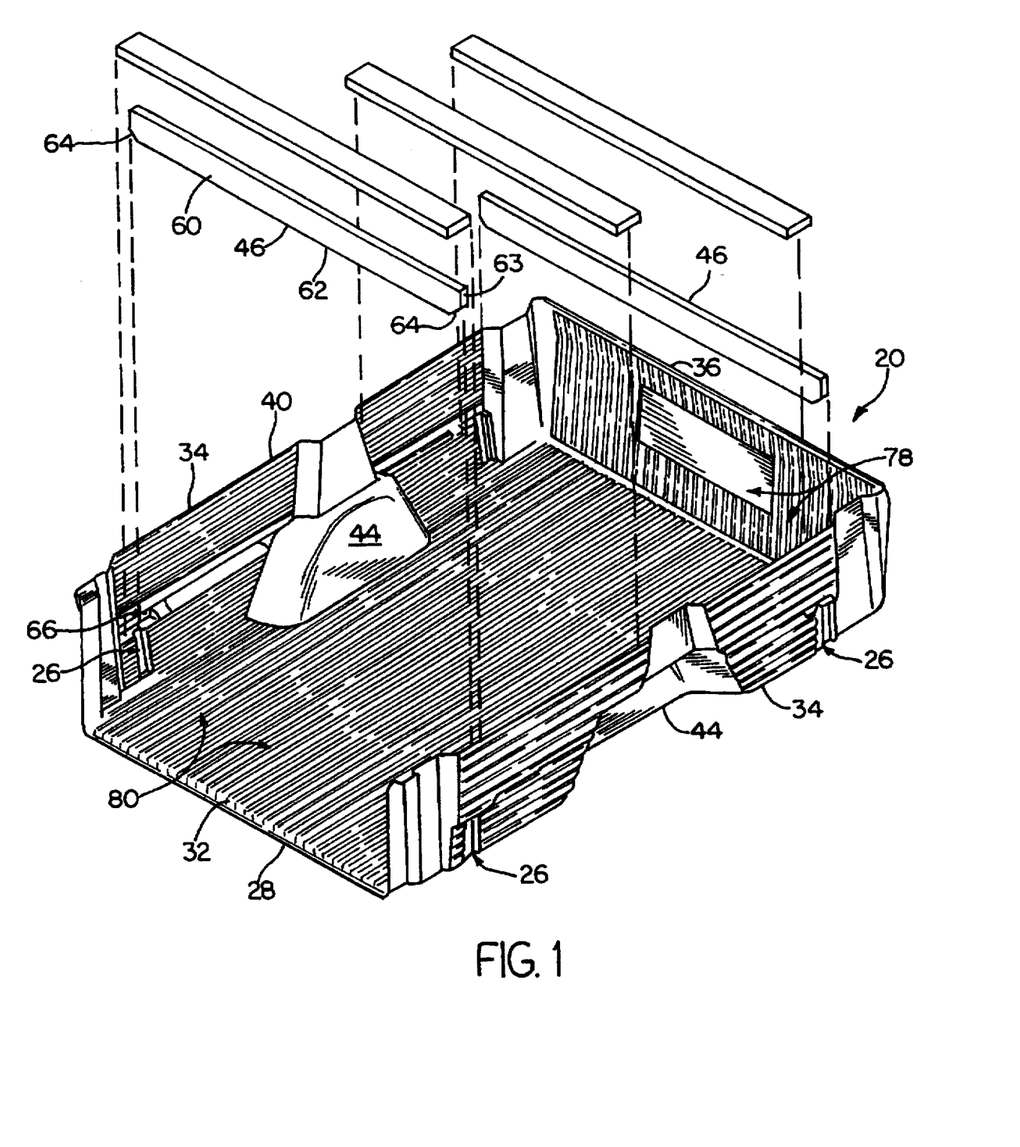
FIG. 1 is an isometric view of the bed liner of this invention together with load supporting and restraining members shown in exploded view.
Figures 2, 3:
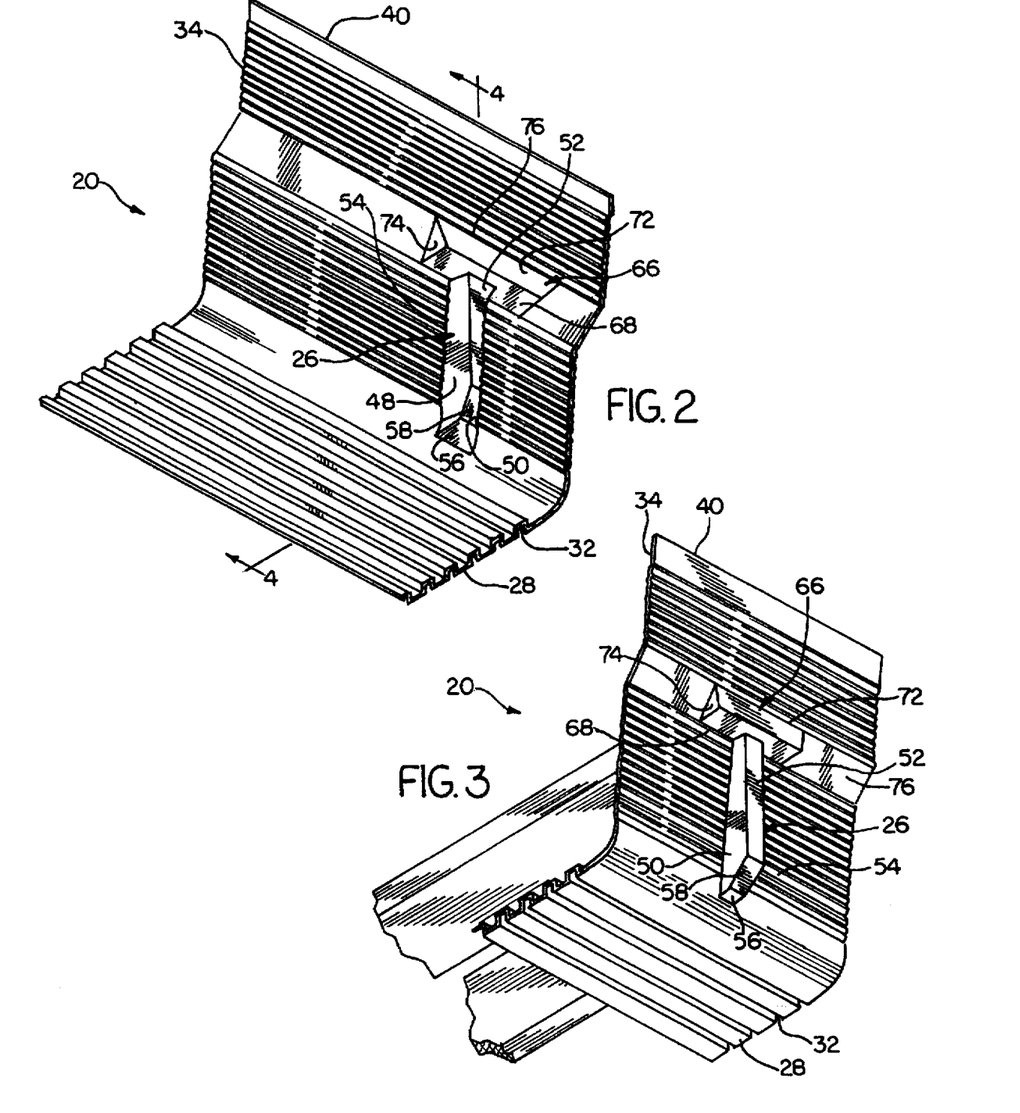
FIG. 2 is a fragmentary top isometric view of the bed liner of FIG. 1.
FIG. 3 is a fragmentary bottom isometric view of the bed liner of FIG. 1.

As shown in FIG. 2, a channel 26 is formed in each liner side wall 34 forward and rearward of the liner wheel well 44. The channels 26 are positioned opposite one another as pairs. As shown in FIG. 1, each pair is adapted to receive a load restraining member 46 which may be a conventional 2×4 board or a specially formed divider. The load restraining member 46 extends transversely from one channel 26 of the pair to the other to restrain the longitudinal movement of articles positioned within the bed liner 20. As best shown in FIG. 4, each channel 26 is recessed into the bed liner side wall 34 so as not to intrude into the bed liner cargo volume. Front and rear restraining walls 48, 50 extend inwardly from a channel exterior wall 52 to a portion 54 of the side wall 34 which surrounds the channel 26. The channel exterior wall 52 is positioned outwardly from the surrounding portion 54 and forms a backstop against side-to-side movement of the restraining member 46.

Each channel 26 has a base wall 56 which extends between the front restraining wall 48 and the rear restraining wall 50, and between the wall 52 and the side wall surrounding portion 54. The channel base wall 56 is generally horizontal and in one preferred embodiment is located to be approximately coplanar with the tops of the ribs 32. A base wall located thus will partially support the load restraining member 46 which extends between the channels of a pair. The load restraining member will also be supported in part by the ribs 32. However, in an alternative structure the base wall may be positioned below the level of the ribs and in such a case will not support the load restraining member. As the side wall 34 is inclined from the perpendicular, and the exterior wall of the channel is more substantially vertical, the lower portion of the exterior wall is positioned a greater distance outwardly from the side wall surrounding portion than is the upper portion of the exterior wall.

To further stiffen the channel 26 and to facilitate molding of the part 20, a bevel wall 58 preferably extends between the channel base wall 56 and the channel exterior wall 52. As best shown in FIG. 1, the load restraining members 46 have generally vertically extending side faces 60. The side faces 60 engage against the channel front and rear restraining walls 48, 50. An exterior face 63 extends between the side faces 60 within each channel. The restraining members have a bottom face 62 which extends between and beneath the exterior faces 60. A chamfered face 64 is formed on the load restraining member 46 which extends at an angle between the bottom face 62 and an exterior face 63. The chamfered face 64 engages against the bevel wall 58 within the channel 26.

As shown in FIG. 2, a load supporting pocket 66 is preferably formed in the bed liner 20 above each channel 26. The pocket 66 has a generally horizontal base wall 68 spaced above the level of the liner bottom wall 28. The base wall 68 receives one end of a load supporting member 70 which may be a conventional 2×4 board. The pockets 66 are also formed in pairs on opposite sides of the bed liner and enable large width loads to be carried above the level of the wheel well 44.

Each pocket has a generally vertical exterior wall 72 which is located exterior to the pocket base wall 68 and which restricts side-to-side motion of the load supporting member 70 within the pockets. End walls 74 extend upwardly from the base wall 68 and restrict front-to-back motion of the supported members 70. The end walls 74 extend from the exterior wall 72 to an upper surrounding portion 76 of the side wall 34.

Although some truck beds are provided with ledges or other supporting structure against which an elevated liner structure may engage, such structure is not universally present. The load supporting pocket 66 of the bed liner 20 is supported independently of any truck side wall structure by the walls 48, 50, 52 of the channel 26. The channel exterior wall extends downwardly from the pocket base wall 68 at a position midway between the interior and exterior of the pocket base wall. The channel front and rear restraining walls 48, 50 also extend downwardly from the pocket base wall 68. The channel structure rigidities the sidewall beneath the pocket 66 and reduces the possibility that the side wall 34 will buckle under a supported load.

As best shown in FIG. 3, the combined channel 26 and pocket 66 extend towards the exterior of the bed liner 20, and hence do not subtract from the available load carrying volume.

The channels 26 and pockets 66 are preferably positioned both forward of and rearward of the liner wheel well 44. It should be noted, however, that additional channels or pockets may be provided to suit longer beds, or beds of differing configuration.

The bed liner 20 allows the bed of a truck to be selectively divided up for transportation of smaller, easily shiftable loads. These small loads may be positioned against the front wall 36 of the liner 20 and restrained from significant shifting by a load restraining member inserted in the front pair 78 of channels 26. If desired, a taller load restraining member 46 may be inserted in the pair of channels, or two narrow members, such as 2×4 boards may be stacked one upon the other within the channels 26. In a similar manner, cargo may be restrained between the rear pair 80 of channels 26 and the vehicle tailgate (not shown).

Figure 5:
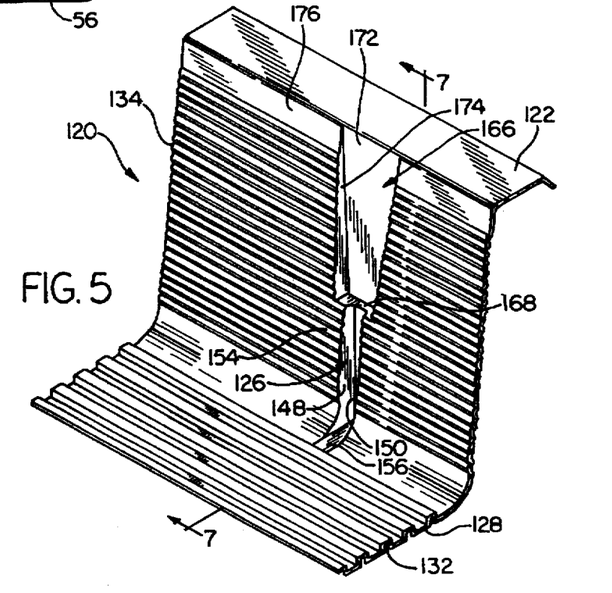
FIG. 5 is a fragmentary top isometric view of an alternative embodiment over-the-rail bed liner of the present invention.
Figure 6:
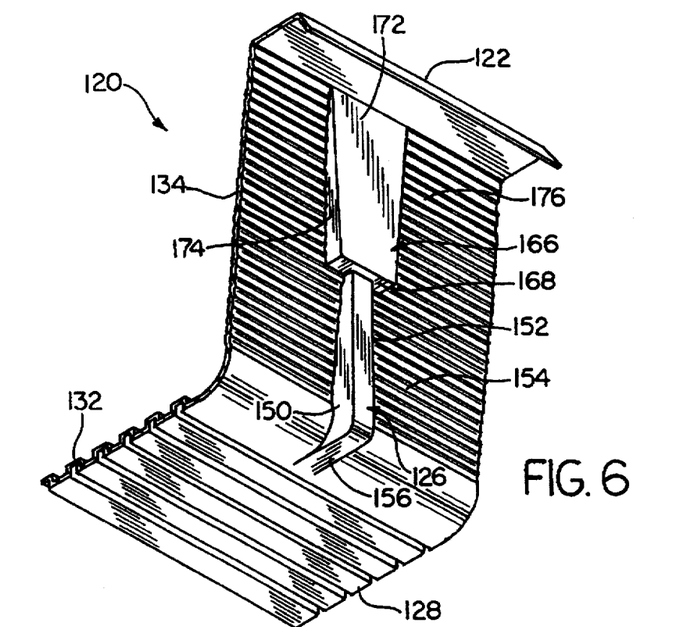
FIG. 6 is a fragmentary bottom isometric view of the bed liner of FIG. 5.
Figure 7:
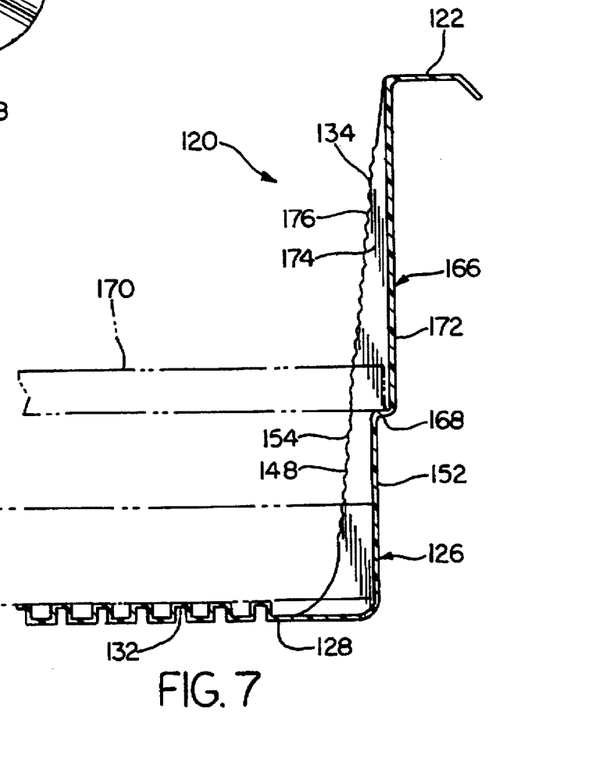
FIG. 7 is a cross-sectional view of the bed liner of FIG. 5 taken along section line 7—7.

An alternative embodiment over-the-rail bed liner 120 is shown in FIGS. 5–7. The bedliner 120 may be installed within the cargo bed of a pick-up truck and has unitary flanges or rails 122 which extend over and shield the side rails of the truck. The bed liner 120 has two pairs of load-restraining channels 126 and two pairs of load supporting pockets 166.

The bed liner 120 has a bottom wall 128 which overlies and covers the truck cargo bed floor. The bed liner bottom wall 28 has longitudinal ribs 132.

As shown in FIG. 7, the side wall 134 extends upwardly from the bed liner bottom wall 128 and is inclined from the liner bottom at an angle greater than perpendicular, preferably an angle of up to twelve degrees.

As best shown in FIG. 5, a substantially vertical channel 126 is formed in each liner side wall 134. Within a bed liner 120 channels 126 are positioned opposite one another as pairs which are adapted to receive a load restraining member 146 which may be a conventional 2×4 board or a specially formed divider. As best shown in FIG. 6, each channel 126 is recessed into the bed liner side wall 134 so as not to intrude into the bed liner cargo volume.

Front and rear restraining walls 148, 150 extend inwardly from a channel exterior wall 152 to a portion 154 of the side wall 134 which surrounds the channel 126. The channel exterior wall 152 is positioned outwardly from the surrounding portion 154 and forms a backstop against side-to-side movement of the restraining member 146.

Each channel 126 has a base wall 156 which extends between the front restraining wall 148 and the rear restraining wall 150. The channel base wall 156 is positioned below the level of the exteriors and does not directly support the load restraining member 146.

As shown in FIG. 5, a load supporting pocket 166 is preferably formed in the bed liner 120 above each channel 126. The pocket 166 has a generally horizontal base wall 168 spaced above the level of the liner bottom wall 128. The base wall 168 receives one end of a load supporting member 170 which may be a conventional 2×4 board. The pockets 166 are also formed in pairs on opposite sides of the bed liner.

Each pocket has a generally vertical exterior wall 172 which is located exterior to the pocket base wall 168 and which restricts side-to-side motion of the load supporting member 170 within the pockets. The exterior wall 172 extends from the base wall 168 to the liner flange 122. End walls 174 extend upwardly from the base wall 168. The end walls 174 extend from the exterior wall 172 to an upper surrounding portion 176 of the side wall 134.

As in the liner 20, the load supporting pocket 166 of the bed liner 120 is supported independently of any truck side wall structure by the walls 148, 150, 152 of the channel 126. The channel exterior wall extends downwardly from the pocket base wall 168 at a position midway between the interior and exterior of the base wall. The channel front and rear restraining walls 148, 150 also extend downwardly from the pocket base wall 168. The channel structure rigidities the sidewall beneath the pocket 166 and reduces the possibility that the side wall 134 will buckle under a supported load.

As best shown in FIG. 6, the combined channel 126 and pocket 168 extend towards the exterior of the bed liner 120, and hence do not subtract from the available load carrying volume.

Figure 8:
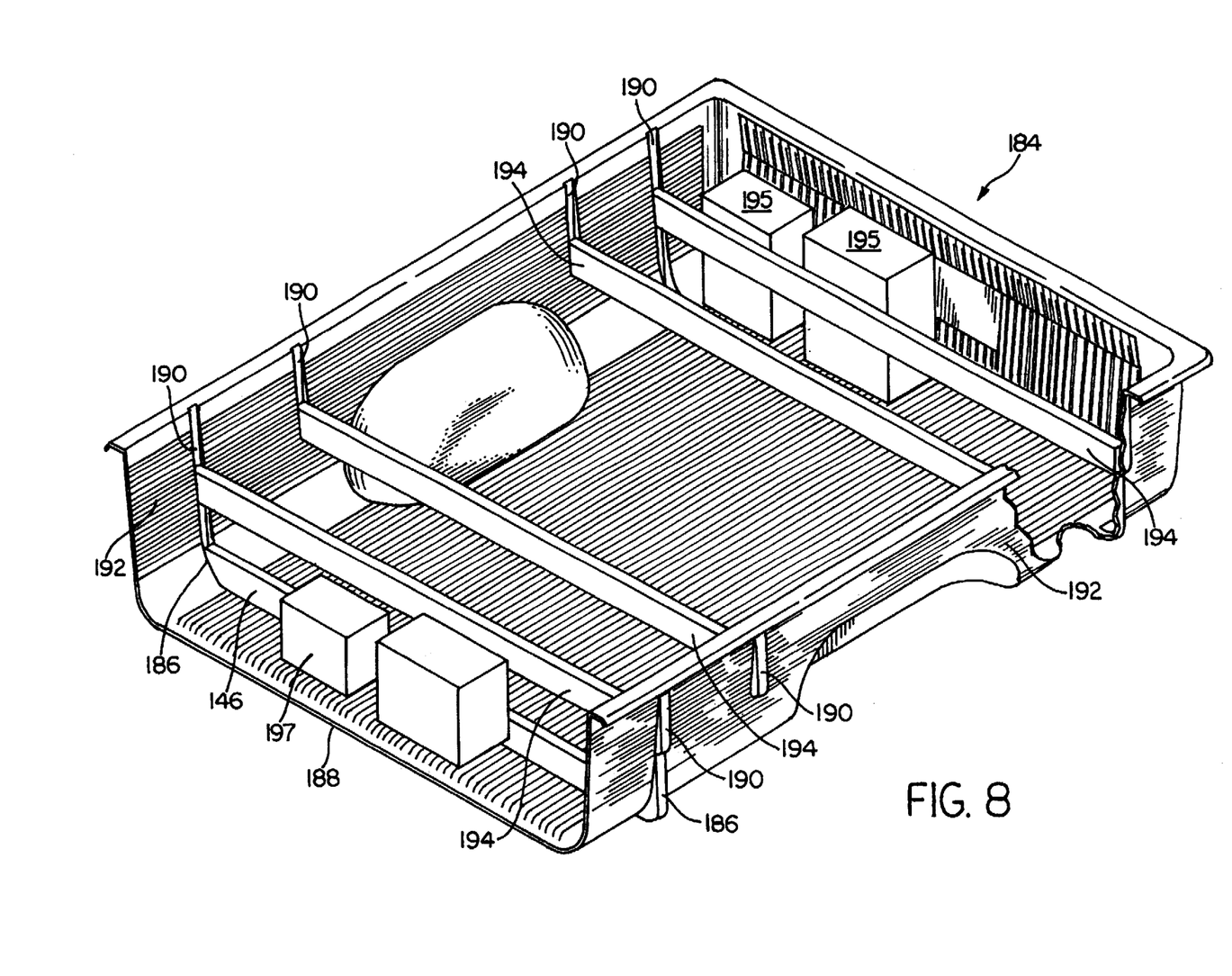
FIG. 8 is a top isometric view of another alternative embodiment bed liner of the present invention having multiple load restraining channels in stacked relation.

Another alternative embodiment of the bed liner of this invention is shown in the over-the-rail bed liner 184 of FIG. 8. The bed liner 184 has load restraining channels 186 which are positioned in close proximity to the bottom wall 188 of the liner 184 and also has load restraining channels 190 which are spaced above the channels 186 on the side walls 192 of the liner. Load restraining members 146 are engaged in the lower channels 186, and additional load restraining members 194, which are slightly longer, are engaged in the upper channels 190. The upper channels 190 may be positioned in alignment with the lower channels 186, or may be positioned independently of any other channel.

A load restraining member may be positioned in a pair of upper channels 190 to prevent taller articles 195 from tipping. Additionally, a load restraining member 146 may be positioned in a lower channel 186 to prevent the motion of a shorter article 197. If desired, a series of upper load restraining members 194 may be positioned in the upper channels 190 and a large width load such as a sheet of plywood, or a shelf (not shown), may be positioned to overlie the upper load restraining members 194.

Figure 9:
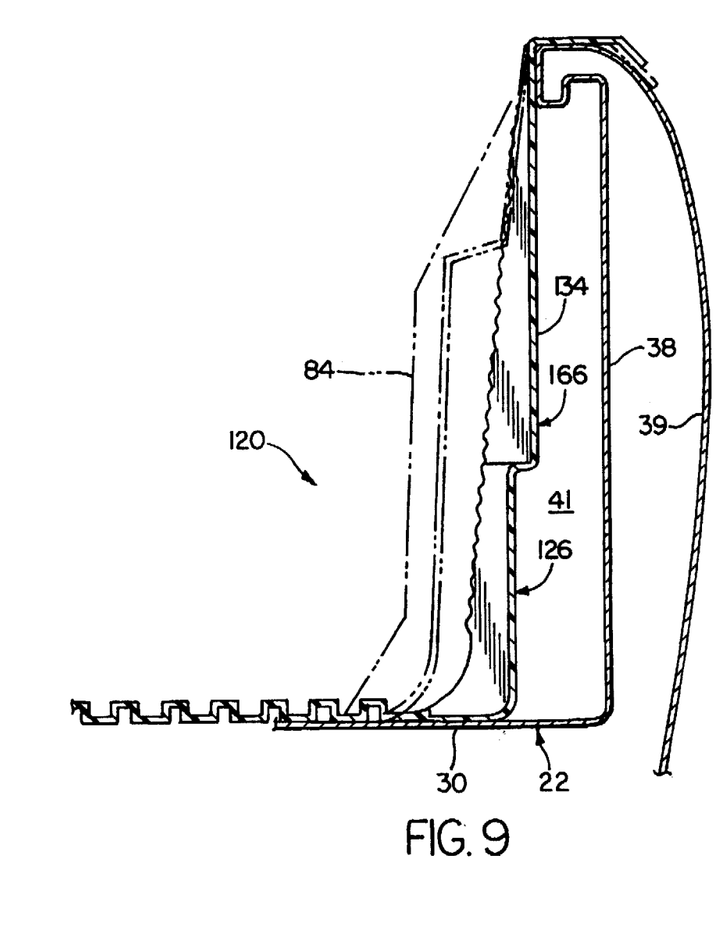
FIG. 9 is a cross-sectional view of the bed liner of FIG. 1 shown in relation to a conventional truck bed.
Figure 10:
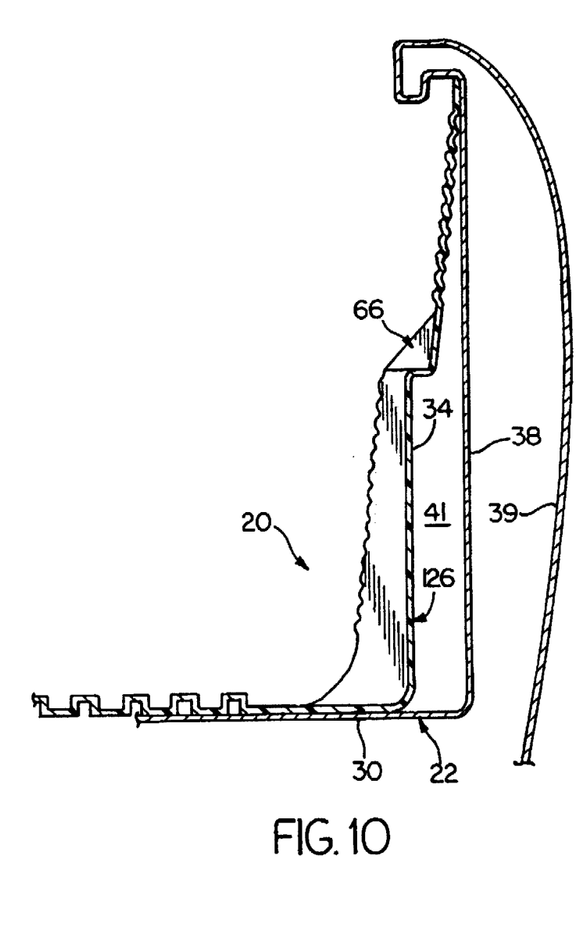
FIG. 10 is a cross-sectional view of the bed liner of FIG. 5 shown in relation to a conventional truck bed.

The additional usable volume yielded by the bed liner of the present invention is illustrated in FIGS. 9 and 10 which show a conventional truck bed 22 which has a floor 30 and vertical interior side walls 38 and exterior sheet metal 39. Typically, the intermediate volume 41 defined between the truck bed interior side wall 38 and the liner side wall 134 is not available for carrying working loads. Prior art bed liners which have provided load restraining structure, utilize extensions of the liner from the side wall into the bed liner interior. These interior protrusions subtract an amount of usable volume even greater than the intermediate volume defined above. This trade-off of potentially useful volume for added features is avoided in the bed liners of the present invention. For comparison, a phantom representation of a prior art bed liner 84 is shown in FIG. 9. The bed liner 120 of the present invention does define an intermediate volume 41 which is not available for storage of loads. However, the bed liner makes constructive use of this volume 41 by extending the structure of the channel 126 and pocket 166 into the intermediate volume 41. No structure extends into the otherwise usable volume of the bed liner 120.

The intermediate volume 41 between the under-the-rail bed liner 20 and the side wall 38 of the truck bed 22 is illustrated in FIG. 10.

It should be noted that bed liners of the present invention may be formed to be utilized with a wide variety of conventional truck beds, in which case the molded liner may take on a general shape which conforms to the dimensions of the particular bed.

It is understood that the invention is not confined to the particular construction and arrangement of parts herein illustrated and described, but embraces all such modified forms thereof as come within the scope of the following claims.

I claim:

1. A unitary thermoformed thermoplastic truck bed liner for mounting within a vehicle cargo bed having a pair of upwardly extending side walls, the liner comprising:
   a) a bottom wall;
   b) two side walls which extend upwardly from opposite sides of the bottom wall such that when the liner is mounted within a vehicle cargo bed each of the side walls of the liner and a corresponding one of the side walls of the vehicle cargo bed define therebetween an intermediate volume, each of the side walls of the liner including a vertically extending channel the channel extending outwardly into the intermediate volume defined between said side wall of the liner and the corresponding one of the side walls of the vehicle cargo bed when the liner is mounted therein, and the channel including an exterior wall positioned outwardly from a portion of said side wall of the liner that surrounds the channel, and front and rear restraining walls extending from the exterior wall inwardly to the side wall surrounding portion to form an inwardly opening receptacle, and wherein the channels on the two side walls of the liner are positioned opposite one another and are adapted to receive a load restraining member which extends transversely from one of the channels to the other to restrain movement of articles positioned within the liner, and a load supporting pocket positioned above the channel, the pocket having a generally horizontal base wall, and a generally vertical exterior wall, wherein the channel intersects the base wall of the pocket, and wherein the exterior wall and front and rear restraining walls of the channel extend downwardly from the base wall of the pocket to support said side wall against buckling when a load supporting member is supported in the pocket.

2. The bed liner of claim 1 wherein each channel has a base wall which extends between the front and rear restraining walls, the exterior wall and the side wall surrounding portion to close the bottom of the channel.

3. The bed liner of claim 2 wherein the channel base wall has a substantially horizontal portion extending outwardly from the side wall surrounding portion and a bevel portion which extends upwardly and outwardly from the horizontal portion to the channel exterior wall.

4. The bed liner of claim 3 further comprising a load restraining member which extends between the channels, wherein the load restraining member has generally vertically extending side faces which engage against the channel front and rear restraining walls, an exterior face extending between the side faces, and a bottom face which extends generally parallel to the liner bottom wall, and wherein the load restraining member also has a chamfered face which extends between the bottom face and the exterior face and engages against the channel base wall bevel portion.

5. The bed liner of claim 2 wherein the bottom wall has a plurality of upstanding ribs and the base walls of at least one pair of channels are located at a level which will permit a planar load restraining member extending between the channel pair to be at least partially supported by the bottom wall ribs.

6. The bed liner of claim 1 wherein each side wall is inclined outwardly from the bottom wall at an angle greater than perpendicular, the channel exterior wall is substantially vertical and the lower portion of the exterior wall is positioned a greater distance outwardly from the side wall surrounding portion than is the upper portion of the exterior wall.

7. The bed liner of claim 1 wherein the pocket base wall has an exterior and an interior, and wherein the channel exterior wall extends downwardly from the pocket base wall at a position midway between the interior and exterior of the pocket base wall, and wherein the channel front and rear restraining walls are positioned laterally between the pocket end walls.

8. A thermoformed thermoplastic truck bed liner for mounting within a vehicle cargo bed having a pair of generally vertical side walls the bed liner comprising:
   a) a bottom wall;
   b) two liner side walls which extend upwardly from the opposite sides of the bottom wall, each liner side wall being inclined outwardly from the liner bottom wall at an angle greater than perpendicular, and each of the liner side walls and a corresponding one of the side walls of the vehicle cargo bed defining therebetween an intermediate volume when the bed liner is mounted within a vehicle cargo bed;
   c) at least one load supporting pocket recessed within each liner side wall to extend into said intermediate volume defined between said liner side wall and one of the side walls of the vehicle cargo bed, wherein each pocket has a generally horizontal load supporting base wall, a generally vertical exterior wall extending upwardly from the load supporting base wall, and positioned outwardly from an upper portion of the liner side wall surrounding the load supporting pocket, and a pair of end walls extending upwardly from the load support pocket base wall and between the exterior wall and the side wall upper portion surrounding the load supporting pocket and wherein the pockets on the two liner side walls are positioned opposite one another to receive and structurally support load support members which may removably engage and extend between the pockets of the liner side walls to support a load thereon; and
   d) a substantially vertically extending channel formed in each of the liner side walls beneath the load supporting pocket thereof, wherein the channel has an exterior wall which extends downwardly from the pocket load supporting base wall and is positioned outwardly from a portion of the liner side wall that surrounds the channel, and has front and rear restraining walls extending from the channel exterior wall inwardly to the liner side wall surrounding portion, the channel exterior wall and front and rear restraining walls extending downwardly from the load supporting base wall of the pocket to support the side wall against bucking when a load support member is supported in said pocket and to form an inwardly opening receptacle, and wherein the channels on the two liner side walls are each adapted to receive a load restraining member which extends transversely from one channel to an opposite channel to restrain movement of articles positioned within the bed liner.

9. The bed liner of claim 8 wherein the pocket base wall has an exterior and an interior, and wherein the channel exterior wall extends downwardly from the pocket base wall at a position midway between the interior and exterior of the pocket base wall, and wherein the channel front and rear restraining walls are positioned laterally between the pocket end walls.

10. In a thermoformed thermoplastic truck bed liner for mounting within a vehicle cargo bed which has approximately vertical truck side walls, the liner having a bottom wall and planar side walls extending upwardly from the bottom wall each of the side walls of the liner and a corresponding one of the truck side walls defining therebetween an intermediate volume when the liner is mounted within the vehicle cargo bed and each of the side walls of the liner being inclined outwardly from the bottom wall at an angle greater than perpendicular the improvement comprising at least one substantially vertically extending channel in each side wall of the liner, wherein the channel extends into said intermediate volume defined between said side wall of the liner and the corresponding one of the truck side walls, and wherein the channel has a substantially vertical exterior wall positioned outwardly from a portion of said side wall of the liner that surrounds the channel, the exterior wall of the channel having an upper portion, and a lower portion positioned a greater distance outwardly from said portion of the side wall of the liner that surrounds the channel than is the upper portion, and front and rear restraining walls extending from the exterior wall inwardly to said portion of the side wall of the liner that surrounds the channel, to form an inwardly opening receptacle, and wherein the channel is adapted to receive a load restraining member which extends transversely across a bed liner to restrain movement articles positioned within the bed liner; and further comprising a load supporting pocket positioned above the channel, the pocket having a generally horizontal base wall and a generally vertical exterior wall, wherein the channel intersects the pocket base wall, and the channel exterior wall and front and rear restraining walls extend downwardly from the pocket base wall to reinforce said side wall of the liner against buckling.

11. A truck bed liner for mounting within a vehicle cargo bed having opposite side walls, the truck bed liner comprising:

a bottom wall;

opposite side walls extending upwardly from the bottom wall, the side walls of the truck bed liner defining therebetween a bed liner cargo volume, each of the side walls of the truck bed liner and a corresponding one of the side walls of a vehicle cargo bed defining therebetween an intermediate space when the truck bed liner is mounted within the vehicle cargo bed, and each of the side walls of the truck bed liner including a pocket extending outwardly from the bed liner cargo volume and into the intermediate space defined between said side wall of the truck bed liner and the corresponding one of the side walls of the vehicle bed when the truck bed liner is mounted in the vehicle cargo bed, the pocket including a base wall adapted to support a load restraining member thereon, an exterior wall extending upwardly from the base wall, and opposite end walls extending upwardly from the base wall and outwardly to the exterior wall, and a channel extending downwardly from the pocket and outwardly from the bed liner cargo volume and into said intermediate space when the truck bed liner is mounted in the vehicle cargo bed, the channel being adapted to receive a load restraining member, and the channel including an exterior wall, and front and rear restraining walls extending outwardly to the exterior wall of the channel, the exterior wall of the channel and the front and the rear restraining walls extending downwardly from the base wall of the pocket to support said side wall of the truck bed liner against buckling when a load restraining member is supported on the base wall.

12. A truck bed liner as set forth in claim 11 wherein the channels on the two side walls of the truck bed liner are positioned opposite One another to receive a load restraining member which extends transversely from one of the channels to the other to restrain the movement of articles positioned within the bed liner cargo volume, and wherein the pockets on the two side walls of the truck bed liner are positioned opposite one another to receive an additional load restraining member which is positioned above the channels and which extends transversely from one of the pockets to the other to restrain movement of articles positioned within the bed liner cargo volume.

13. A truck bed liner as set forth in claim 11 wherein each of the side walls of the truck bed liner are inclined outwardly.

14. A truck bed liner as set forth in claim 11 wherein the exterior wall of the pocket of each of the side walls of the truck bed liner is positioned outwardly of the exterior wall of the channel of said side wall of the truck bed liner so than said pocket is deeper in a lateral direction than said channel, and wherein the front and rear restraining walls of said channel are positioned between the end walls of said pocket such that said pocket is wider in a longitudinal direction than said channel.

15. A truck bed liner as set forth in claim 11 wherein each of the side walls of the truck bed liner includes an inside surface, the inside surfaces of the side walls of the truck bed liner defining therebetween the bed liner cargo volume, wherein the pocket and the channel of each of the side walls of the truck bed liner open upwardly and are recessed from the inside surface of said side wall, and wherein the channel of each of the side walls of the truck bed liner is recessed within the pocket of said side wall.

16. A truck bed liner as set forth in claim 11 wherein each of the channel and the pocket of each of the side walls of the truck bed liner define an inwardly opening receptacle, and wherein the receptacle defined by the channel of each of the side walls of the truck bed liner is recessed within the receptacle defined by the pocket of said side wall.

* * * * *